V. A. FYNN.
ALTERNATING CURRENT MOTOR.
APPLICATION FILED DEC. 26, 1916.

1,406,366.

Patented Feb. 14, 1922.
2 SHEETS—SHEET 1.

INVENTOR
Valère A. Fynn
BY
E. E. Huffman
ATTORNEY

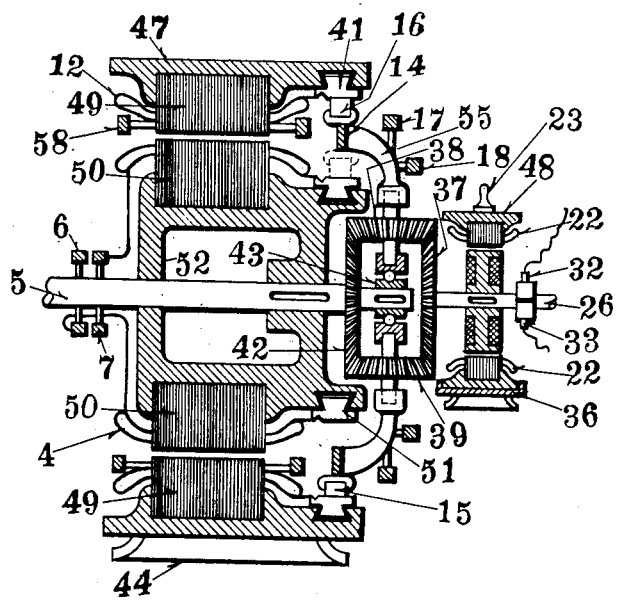

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,406,366.   Specification of Letters Patent.   Patented Feb. 14, 1922.

Application filed December 26, 1916. Serial No. 138,792.

*To all whom it may concern:*

Be it known that I, VALÈRE A. FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to single-phase motors of the induction type.

One of my objects is to place the power factor of such machines under control, and another is to provide improved means for operating such motors.

In carrying out my invention, I provide means for introducing into the secondary or induced member, and preferably along the axis of the resultant revolving field present in such machines when they are operated in the manner heretofore known, a direct current of preferably adjustable magnitude for the purpose of controlling the power factor of the machine. I derive this direct current either from an outside source or, according to another feature of my invention, from the motor itself. I prefer to introduce this direct current into the induced member by means of brushes revolving at synchronous speed with respect to the primary inducing member. In order to start the machine, I provide means for varying the current in the induced member by changing the magnitude, or the magnitude and phase of the effective voltage, or the resistance of the induced member along one or more of its axes, or by varying the terminal voltage of the machine, but in all cases I first bring the brushes to synchronism, and connect them to a source of direct current E. M. F.

Figure 1:
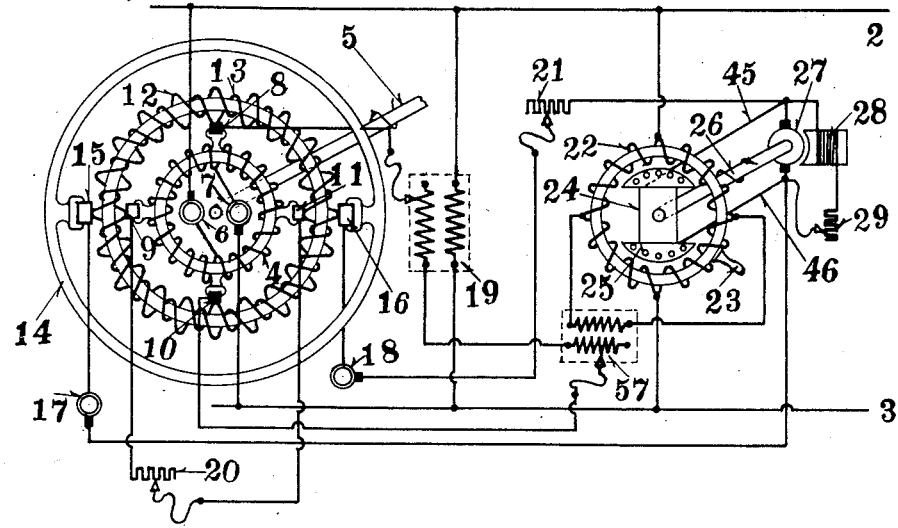
Figure 2:
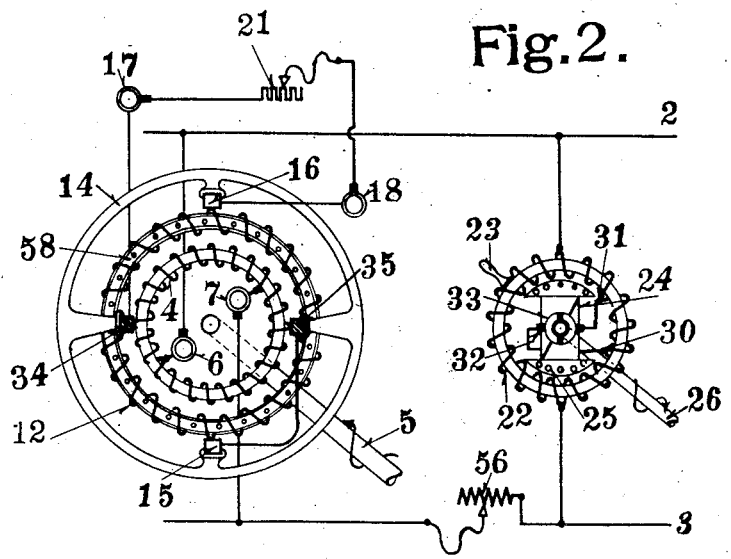

Referring to the accompanying drawings, Figures 1 and 2 are diagrammatic representations of two-pole motors embodying my invention, and Fig. 3 shows certain mechanical features of the motor.

Referring to Fig. 1, the primary or inducing member is adapted to revolve and is mounted on the shaft 5. This member is provided with a winding 4, tapped at diametrically located points, which are made accessible by way of the slip rings 6, 7, and the brushes co-operating therewith. These slip rings are connected to the mains 2, 3. The stationary, which is the secondary or induced member, is provided with two commuted windings, 12 and 13. The winding 13 co-operates with the brushes 8, 9, 10, 11 carried by the revolving primary but insulated therefrom. The brushes 8, 10 are adapted to give access to the secondary 13 along an axis which always coincides with that along which the primary 4 is connected to the supply. The brushes 9, 11 are adapted to give access to this same winding along an axis displaced by 90 electrical degrees from that of the brushes 8, 10. The magnitude and phase of the voltage in the circuit comprising the brushes 8, 10 can be changed by means of the variable ratio transformer 19, the primary of which is connected across the mains 2, 3, and the variable ratio transformer 57, while the resistance in the circuit comprising the brushes 9, 11 can be varied by means of the adjustable resistance 20 and the movable contact co-operating therewith. Either brush circuit can be short-circuited. The brushes 15, 16 which are supported by but insulated from the movable rocker-arm 14 co-operate with the second commuted winding 12 on the induced member. These brushes are connected to slip rings 17, 18 carried by said rocker-arm.

A synchronous motor, the stationary primary 22 of which is connected to the mains, 2, 3, is placed in axial alinement with the main motor. The primary of the variable ratio transformer 57 is connected to the winding 22 at points displaced by 90 electrical degrees from those at which this winding is connected to the mains, whereby an E. M. F. in quadrature with the line E. M. F. is impressed on the transformer 57. The revolving member of this synchronous motor carries an exciting winding 24 adapted to produce a unidirectional magnetization, and short circuited bars 25 located in the polar projections of said member. The revolving member is mounted on the shaft 26, which also carries the armature 27 of a direct-current dynamo electric machine provided with the stationary field structure 28. The excitation of this dynamo can be varied by means of the adjustable resistance 29, and its brushes are connected to the winding 24 of the field magnet of the synchronous motor by means of the leads 45, 46. In practice a slip ring and a brush co-operating therewith would be inserted in each of these leads, because the brushes of the direct-current exciter are stationary whereas the field winding 24 revolves. The armature 27 of this direct current dynamo is also connected to the brushes 15, 16 of the main motor by way of the slip rings 17, 18, and with the interposition of an adjustable resistance 21.

The movable brush rocker 14 carrying the brushes 15, 16, is so driven as to rotate at a speed equal to the difference between the speed of the shaft 26 of the synchronous motor and the shaft 5 of the main motor, and in a direction opposed to that in which shaft 5 revolves. This is done, as shown in Fig. 3, by means of the bevel wheels 37, 42 and the pinions 38, 39. The wheel 42 is keyed to the shaft 5 of the main motor; the wheel 37 to the shaft 26 of the synchronous motor. The pinions 38, 39 are free to revolve about their axes and are also free to revolve about the shaft 5 on which they are supported and centered by means of the ball bearing 43. The shafts of these pinions support the rocker-arm 14 by means of the arms 55, and in such a way as to force the rocker arm 14 to follow the motion of the pinions 38, 39 whenever these revolve about the shaft 5.

In normal operation and assuming the rotor of the main motor, which in this case is the primary, to be revolving in a counter-clockwise direction, the synchronous motor must be so operated that its shaft rotates in a clockwise direction. If the shaft 5 revolves at a synchronous speed, then its speed is the same as that of the shaft 26. The pinions 38, 39 do not move about the shaft 5, and the rocker-arm remains stationary in space, while the relative speed between the brushes 8, 9, 10, 11 and the commuted winding, is also synchronous. As soon as the speed of the shaft 5 of the main motor falls below the synchronous, then the pinions 38, 39 begin to revolve about the shaft 5 in a clockwise direction, bringing about a relative movement between the brushes 15, 16 and the secondary commuted winding 12. This relative movement is equal to the slip of the main motor. The brushes 8, 9, 10, 11 have a relative speed with respect to the secondary commuted winding 13, which is equal to the synchronous less the slip.

While the stator 48 of the auxiliary synchronous motor is stationary, yet it is so carried on the base 36 that it can be moved through a certain angle about the shaft 26 by means of the handle 23, as best shown in Fig. 3.

Referring now to Fig. 2, the revolving primary here carries a commuted winding 4, two diametrically located points of which are connected to the line, 2, 3, by means of the slip rings 6, 7, and the brushes co-operating therewith. This rotor is mounted on the shaft 5. The stationary secondary of this machine carries the squirrel-cage winding 58 and the commuted winding 12. The brushes 15, 16, co-operate with the stationary commuted winding 12, the brushes 34, 35 with the revolving commuted winding 4, and all four brushes are supported by the movable rocker-arm 14. The brush 35, co-operating with the rotor commuted winding 4, is directly connected to the brush 15 co-operating with the stator commuted winding 12. The brush 34, co-operating with the rotor commuted winding 4, is connected to the brush 16 co-operating with the stator commuted winding 12 by way of the slip rings 17, 18, the brushes co-operating therewith, and the adjustable resistance 21. On the shaft 26 is mounted the revolving member of a self-excited synchronous single-phase motor located in axial alinement with the main motor. The stationary member of this machine carries the winding 22 connected to the mains 2, 3, while the revolving member is of the defined polar projection type and is provided with an exciting winding 24 connected to the segments of a commutator 33. The stationary brushes 32, co-operating with this commutator, are connected at the points 30 and 31 to a part of the stator winding 22. The rocker-arm 14 is driven at a speed which is the difference between the speeds of the shafts 26 and 5, in a manner already described in connection with Fig. 1 and fully illustrated in Fig. 3. The stator of the auxiliary synchronous motor is provided with a handle 23 for the purpose of moving this stator through a certain angle.

In normal operation, the shafts 5 and 26 must revolve in opposite directions. The shaft 26 will always revolve at synchronous speed, and the speed of the shaft 5 will vary with the load, being nearly equal to synchronous at no load and diminishing with increasing load. In case the speed of both shafts is synchronous, the rocker-arm 14 will remain stationary in space, there will be no movement of the brushes 15, 16 relatively to the stationary commuted winding 12, and the revolving commuted winding 4 will rotate at a synchronous speed with respect to the brushes 34, 35. When the speed of the shaft 5 falls below the synchronous, then the rocker-arm 14 will be propelled in the same direction as that in which shaft 26 of the auxiliary synchronous motor revolves and at a speed equal to the slip of the main motor. In this case the brushes 15, 16 will move at slip speed with relation to the stationary commuted winding 12, but the difference in speed between the revolving commuted winding 4 and the revolving brushes 34, 35 will still be equal to the synchronous.

In Fig. 3, the stator laminations 49, in which the squirrel cage 13 and the commuted winding 12 are embedded, is held in a frame 47 provided with feet 44. This frame also holds the commutator 41 belonging to the commuted winding 12. The rotor laminations 50, in which the rotor winding 4 is embedded, are held in a frame 52, which also supports the commutator 51 belonging to the winding 4. The slip rings 6, 7, by means of which the primary winding is connected to the mains 2, 3, are supported by the shaft 5. This shaft also carries the toothed wheel 42 co-operating with the pinions 38, 39 centered on the shaft 5 by means of the ball bearing 43. The shafts of these pinions support the movable rocker-arm 14 by means of the arms 55 to which are insulatingly attached the slip rings 17, 18. The rocker-arm 14, insulatingly supports the brushes co-operating with the commutator 51, as well as those co-operating with the commutator 41. The brushes 15, 16, co-operating with 41, are shown in full lines; one of the others is indicated in dotted lines. The latter cannot properly be shown in Fig. 3 because it is so displaced from the brushes 15, 16 as not to be seen in that figure.

In explaining the operation of this machine I will first refer to Fig. 2, and assume for the moment that the brushes 34, 35 are omitted or lifted out of engagement with the primary commuted winding 4. It is known that such a machine will run at nearly synchronous speed, and decrease its speed a little with increasing load up to the breakdown point when the speed will rapidly fall to zero if the load is not decreased. When the rotor is at rest, there is only an alternating field in the machine, but in normal operation a resultant revolving field of nearly constant magnitude is present in this motor, being produced partly by rotor and partly by stator. For a synchronous rotor speed, this resultant field would be stationary in space, but under ordinary conditions, i. e., when the rotor "slips," it resolves at slip speed in a direction opposed to that in which the rotor revolves, with the result that the speed difference between the rotor and the revolving field is always equal to the synchronous speed of the motor. As long as the machine is in operation, this resultant revolving field is produced by a rotor current of line frequency, and by a stator current having one component of line plus speed frequency, and another component of slip frequency. The no-load rotor current is equal to about twice the magnetizing current which the machine would take with the stator on open circuit. The rotor load current is, of course, of line frequency, but the stator load current has one component of line plus speed frequency, and another component of slip frequency. Now, according to this invention, I produce a unidirectional magnetization in the machine, and cause this magnetization to move at slip speed with respect to the stationary member, and in a direction opposed to that in which the rotor revolves. I do this by means of a direct current, which I introduce into the stator by way of the brushes 15, 16 which I rotate at slip speed in the proper direction. I furthermore prefer to so arrange matters that in normal operation the axis of the brushes 15, 16 can be made to coincide all the time with the axis of the revolving field produced by the alternating rotor and stator currents. The brushes 15, 16 are driven at slip speed, for instance, by means of a differential gearing, one part of which is driven at synchronous speed, another part of which is driven at rotor speed, while a third element thereof engages with the two others and drives the brushes. In order to drive the wheel 37 of the differential at synchronous speed, I make use of a synchronous motor the armature of which is stationary and connected to the supply, but the frame, carrying the armature winding 22, is so held in its support 36 as to permit of being moved through a certain angle. This provision is made in order to make it possible to adjust the axis of the brushes 15, 16 when the machine is in operation. Any movement of the winding 22 of the synchronous motor, when the machine is in operation, will be instantly followed by a corresponding movement of the brushes 15, 16, after which the latter will continue to revolve at their proper speed but with their axis in a different position relatively, for instance, to the axis along which the primary is connected to the supply.

The revolving field produced by the alternating currents in a motor of this type, is produced only from the primary when the magnetizing current in that member is a maximum (on the assumption that all E. M. F.'s, currents and fields follow the sine law), while one quarter of a period later it is produced only from the secondary, and at that time the primary magnetizing current is zero. The magnetizing current lags by about one quarter of a period behind the terminal E. M. F. For best power factor, for instance, the preferred position of the axis of the brushes 15, 16, conveying the direct current to the secondary, can therefore be defined by saying that it shall coincide with the axis along which the primary is connected to the supply, the axis 6, 7 in Fig. 2, whenever the terminal E. M. F. or the E. M. F. of the supply is about equal to zero. This, or any other position of the brush axis, can be secured by moving the stator of the synchronous motor 22, 24 by means of the handle 23.

With the brush axis revolving, for instance, in this preferred position, and with no direct current E. M. F. impressed on the brush circuit, the resultant revolving field of the motor will be entirely due to the alternating magnetizing currents circulating in the machine. If a small direct current E. M. F. is impressed on the circuit of the brushes 15, 16, then this field will be produced in part by the direct current conducted into the secondary and in part by the alternating magnetizing currents. The magnitude of the direct-current E. M. F. can be so chosen that the whole of the resultant revolving field of the machine is produced by the injected direct current, in which case all the alternating magnetizing currents usually present in single-phase induction motors will be eliminated and the machine will operate with a power factor near unity. An increase of the direct-current E. M. F. will cause the machine to take leading currents. In this manner the power factor of the machine is placed under the control of the operator and the efficiency of the motor is greatly increased.

Single-phase motors of the induction type have heretofore been compensated either by injecting into the working circuit of the secondary member an E. M. F. opposing the reactance E. M. F.'s in that circuit, or by injecting into the field circuit of the induced member an E. M. F. of practically the same phase as that of the supply for the purpose of changing the phase of the back E. M. F., and in consequence changing the phase relation of the rotor load current to the rotor working E. M. F., and thus adjusting the phase relation of the stator load current and the terminal voltage, since the stator and rotor along the working axis are in ordinary transformer relation. These methods amount to a more or less direct influencing of the phase of the rotor working currents, and merely alter the phase relations of the rotor and stator currents to their E. M. F.'s, but do not eliminate any of said currents. When the magnitude of the direct current introduced into the secondary winding of my improved motor is so chosen as to produce the whole of the revolving field in the motor, then all of the rotor and stator alternating exciting or magnetizing currents are eliminated, leaving nothing but load currents, and in this respect the present compensating method differs radically from any heretofore devised.

While it is in principle immaterial from what source the unidirectional exciting or compensating current is derived, yet it is particularly convenient to derive same from the motor itself, if possible. How this can be done is shown in Fig. 2. To this end the rotor of the motor there shown, is utilized as the armature of a rotary converter. One form of a single-phase rotary converter comprises a revolving member provided with a commuted winding such as 4 in Fig. 2, connected to the supply by means of the slip rings 6, 7; a stationary member provided with a winding adapted to produce unidirectional magnetization and preferably also provided with a squirrel cage winding, such as 58. Stationary brushes, usually displaced by 90 electrical degrees with respect to the axis of that stator winding which is adapted to produce the unidirectional magnetization, are made to co-operate with the commuted winding 4 on the revolving member and are connected to the winding producing the unidirectional magnetization. The revolving member moves synchronously with respect to the stationary brushes, and this condition must be fulfilled if direct current is to be available at the brushes. Now in Fig. 2 all the main elements constituting a single-phase rotary converter are present. The winding 58 on the stator can do duty as damping winding. The commuted winding 12 thereon can be made use of for producing the necessary unidirectional magnetization. The rotor winding 4 can be a commuted winding without interfering with the operation of the machine as a motor, but the rotor is not bound to a synchronous speed. In order to obtain direct current from this rotor, notwithstanding the fact that it does not run synchronously, I provide the brushes 34, 35 to co-operate with the rotor commuted winding 4, displace them preferably by 90 electrical degrees from the brushes 15, 16, which direct the unidirectional stator magnetization, and rotate the brushes 34, 35 at slip speed in a direction opposed to that in which the rotor revolves, therefore at the same speed and in the same direction as the brushes 15, 16, with the result that the actual difference in speed between the brushes 34, 35 and the conductors of the rotor winding 4, remains equal to the synchronous under all conditions, and a direct current becomes available at said brushes irrespective of the speed of the rotor. To this end the brushes 34, 35 are insulatingly supported by the same rocker 14 which carries the brushes 15, 16. When no power factor adjustment is required while the machine is in operation, then the brushes 34, 35 can be directly connected to the brushes 15, 16; but if it is desired to alter the power factor of the machine while the latter is running, then an adjustable resistance 21 can be inserted into the compensating circuit by means of the slip rings 17, 18 and suitable brushes co-operating therewith.

The synchronous two-pole motor shown in Figs. 2 and 3, driving the wheels 37 of the differential gear controlling the brush rocker 14, comprises a stationary member 48 provided with the single-phase winding 22, to which a certain angular movement can be imparted by means of the handle 23, this member being so carried by the fixed support 36 as to allow of such a movement. This angular movement displaces the axis along which the stationary member magnetizes. By so moving the primary of this synchronous motor, it is possible while the motor is in operation to adjust the position of the brush axis 15, 16, independently of the fact that the speed of these brushes relative to that of the primary is kept equal to the synchronous speed of the motor. Such a movement of the primary disturbs this speed relation, but only for as long as said movement lasts. The revolving member of this synchronous motor carries the exciting winding 24 connected to a two-part commutator, which co-operates with stationary brushes 32 connected to a part of the stator winding at the points 30, 31. In this manner the machine is made self-exciting, the commutator being used for the purpose of rectifying the alternating exciting current derived from the main stator winding 22 in a manner now well understood. It is also well known that machines of this kind can be readily started from rest by suitably displacing the brushes 32.

The arrangement of the motor shown in Fig. 1 differs from that of Fig. 2, in that the revolving primary winding 4 is not a commuted winding; in that the stationary short circuited secondary winding 13 is short circuited along two axes 8, 10 and 9, 11, which revolve with the primary instead of being short circuited along a plurality of axes fixed with respect to the secondary; and in that the direct current excitation is derived from a small direct-current generator 27, 28 coupled to the synchronous motor driving the wheel 37 of the differential which controls the movement of the brush rocker-arm 14. This small generator also supplies the excitation for the synchronous motor. The magnitude of this excitation can be varied by means of the adjustable resistance 29 located in the shunt circuit, while the excitation or phase compensation of the main motor can be independently regulated by means of the adjustable resistance 21. The operation of the machine is the same as that shown in Fig. 2, with the differences that when the direct current compensating circuit is interrupted, there is a magnetizing current of line frequency in the secondary winding 13 along the axis 9, 11; a corresponding current of same frequency in the winding 13 along the axis 8, 10; and a primary idle current of line frequency in the primary 4, equal to about twice the rotor magnetizing current, while the load current is of line frequency in both members, and appears in the secondary 13 along the axis 8, 10. When the resultant revolving field of the motor is entirely produced by menas of a direct current introduced into the winding 12 by way of properly located brushes 15, 16, revolving at slip speed, then the double rotor magnetizing current and the magnetizing currents in the two stator axes all disappear, and the power factor of the machines approaches unity.

In order to start that form of my improved motor in which the secondary member is closed along axes which are stationary with respect to the inducing member, as in Fig. 1, I prefer to interrupt all the secondary circuits; bring the synchronous motor and the brushes it drives up to speed; connect the primary of the motor to the mains; excite the secondary by means of a direct-current supplied to the revolving brushes 15, 16, and adjust the magnitude of this direct current, for instance, so as to eliminate all lagging magnetizng currents in the primary, conductively introduce into the working circuit 8, 10 of the secondary and E. M. F. of about same phase as, and of opposite direction to, that induced in said circuit from the primary, by connecting the brushes 8, 10 to the secondary of the transformer 19, the primary of which is connected to the mains 2, 3; preferably so selecting the magnitude of this auxiliary E. M. F. as to reduce the current in the secondary to a minimum; and reduce the magnitude of the conductively introduced E. M. F., thus increasing the rotor current and the torque of the machine. The machine will start, and will reach a speed near the synchronous when the auxiliary E. M. F. has been reduced to zero.

Having started the machine in the manner described, I can operate it with the secondary closed along one axis, either on itself or on a resistance or on a source of auxiliary E. M. F. If closed on an auxiliary E. M. F., I can vary the speed of the machine by varying the magnitude or the direction of said E. M. F.

I can also start this motor by conductively introducing an E. M. F. into the secondary in the manner described and simultaneously closing that member along another axis on an adjustable resistance, such as 20, reducing this resistance as the auxiliary E. M. F. is reduced. As an alternative, I can discard the auxiliary E. M. F. and close the induced member along the axis 8, 10, or along the axes 8, 10 and 9, 11, over adjustable resistances, diminishing their values with increasing motor speed.

In speaking of the normal operation of the machine, it has been said that it was preferred to so revolve the brushes 15, 16, as to make their axis coincide with that of the magnetization produced by the inducing member every time the line voltage comes near to its zero value. In this position of the brush axis, all the alternating magnetizing currents in the motor can be reduced to negligible values or even entirely eliminated, and the torque conditions will also be very favorable because the alternating current motor working currents will, under normal operating conditions, be about in phase with the line voltage and reach their maximum values just about the time when their axis lies at right angles to that of the field produced by the direct current. At starting and under certain operative conditions, the motor currents along the working axis will lag very considerably behind the line E. M. F., thus reducing the torque per ampere. In order to raise this torque, it is most convenient to so select or adjust the phase of the E. M. F. conductively introduced into the induced member at starting as to bring the current in the working axis of the motor more nearly in phase with the line voltage. One way of bringing this about is to introduce into the induced member at starting an E. M. F. differing in phase from that induced therein from the primary. The E. M. F. induced by the primary 4 along the axis 8, 10 of 13 is practically of same phase as the line E. M. F. When I desire to change the phase of the resultant E. M. F. in 13 along that axis I introduce into this circuit an E. M. F. in quadrature with the line which I derive from the winding 22 of the synchronous motor by means of the variable ratio transformer 57. By connecting the secondary of this transformer in series with that of the transformer 19, and varying the effective secondary turns of one or both of these transformers I can adjust the resultant E. M. F. in 4 along the axis 8, 10 to any desired extent. The resultant E. M. F. in that axis can be adjusted in the same way in normal operation as well as at starting. When no change in speed, but only a phase adjustment, is required, then the transformer 19 can be cut out and only the transformer 57 used.

When the secondary is closed along one or more axes, which are stationary with respect to that member, as in Fig. 2, then I prefer to start the machine by bringing the synchronous motor and the brushes it drives up to speed, impressing a fraction of the line voltage on the primary, for instance, with the help of the adjustable impedance 56 and a fraction of the direct current voltage on the revolving brushes, and increasing both until the motor starts and reaches the desired speed.

The stationary member in Fig. 2 can be short circuited along a plurality of fixed axes by means of pole windings instead of a squirrel cage, in which case resistances or suitable E. M. F.'s can be introduced into these windings at starting, in a manner similar to that described in connection with Figure 1.

Having fully described my invention, what I claim as new and desire to secure by Letters Patent of the United States is:

1. In a single-phase motor, the combination of an inducing member, an induced member provided with a winding closed along at least one axis, a commuted winding for the induced member, brushes co-operating with said winding, means for supplying direct current to said brushes, and means for revolving the brushes at such speed as to cause the relative speed of the brushes and the inducing member to equal the synchronous speed.

2. In a single-phase motor, the combination of an inducing member, an induced member provided with a winding closed along at least one axis, a commuted winding for the induced member, brushes co-operating with said winding, means for deriving direct current from the inducing member and supplying it to the brushes, and means for revolving the brushes at such speed as to cause the relative speed of the brushes and the inducing member to equal the synchronous speed.

3. In a single-phase motor, the combination of a revolving inducing member, a stationary induced member provided with a winding closed along at least one axis, a commuted winding for the induced member, brushes co-operating with said winding, means for supplying direct current to said brushes, and means for revolving the brushes at a speed equal to the difference between the synchronous and the actual speed of the inducing member.

4. In a single-phase motor, the combination of a revolving inducing member, a stationary induced member provided with a winding closed along at least one axis, a commuted winding for the induced member, brushes co-operating with said winding, means for deriving direct current from the inducing member and supplying it to the brushes, and means for revolving the brushes at a speed equal to the difference between the synchronous and the actual speed of the inducing member.

5. In a single-phase motor, the combination with a source of alternating E M F., of an inducing member provided with a commuted winding connected to said source, an induced member provided with a commuted winding and with a winding closed along at least one axis, a set of brushes for each commuted winding, and means for revolving both sets of brushes at such speed as to cause the relative speed of the brushes and the inducing member to equal the synchronous speed.

6. In a single-phase motor, the combination of an inducing member provided with a commuted winding, an induced member provided with a commuted winding and with a winding closed along at least one axis, a set of brushes for each commuted winding, the axes of said brushes being displaced by 90 electrical degrees from each other, and means for revolving both sets of brushes at such speed as to cause the relative speed of the brushes and the inducing member to equal the synchronous speed.

7. In a single-phase motor, the combination with a source of alternating E. M. F., of a revolving inducing member provided with a commuted winding connected to said source, a stationary induced member provided with a commuted winding and with a winding closed along at least one axis, a set of brushes for each commuted winding, and means for revolving both sets of brushes at a speed equal to the difference between the synchronous and the actual speed of the inducing member.

8. In a single-phase motor, the combination of an inducing member, an induced member provided with a winding closed along a plurality of axes, a commuted winding for the induced member, brushes co-operating with said winding, means for supplying direct current to said brushes, and means for revolving the brushes at such speed as to cause the relative speed of the brushes and the inducing member to equal the synchronous speed.

9. In a single phase motor, the combination of an inducing member, an induced member provided with a winding closed along a plurality of axes stationary with respect to said member, a commuted winding for the induced member, brushes co-operating with said winding, means for supplying direct current to said brushes, and means for revolving the brushes at such speed as to cause the relative speed of the brushes and the inducing member to equal the synchronous speed.

10. In a single-phase motor, the combination of a revolving inducing member, a stationary induced member provided with a commuted winding and with a winding closed along at least one axis, movable brushes co-operating with said commuted winding, means for impressing a direct current E. M. F. on said brushes, an auxiliary synchronous motor, and means for revolving the brushes at a speed equal to the difference in speed of the synchronous motor and the inducing member.

11. In a single-phase motor, the combination of an inducing member, an induced member provided with a winding closed along at least one axis, a commuted winding for the induced member, brushes co-operating with said winding, means for supplying direct current to said brushes, means for revolving the brushes at such speed as to cause the relative speed of the brushes and the inducing member to equal the synchronous speed, and additional means for shifting the position of the brushes relative to the commuted winding while the motor is in operation.

12. In a single-phase motor, the combination with a source of alternating E. M. F., of an inducing member, an induced member provided with a commuted winding and with a winding closed along at least one axis, brushes co-operating with the commuted winding, means for supplying a direct current to said brushes, and means for revolving the brushes at such speed as to cause the relative speed of the brushes and the inducing member to equal the synchronous speed of the motor, the axis of the brushes having such relation to the axis along which the inducing member is connected to the source of alternating E. M. F. that these axes substantially coincide when the alternating voltage is passing through zero.

13. In a single-phase motor, the combination with a source of alternating E. M. F., of an inducing member, an induced member provided with a commuted winding and with a winding closed along at least one axis, brushes co-operating with the commuted winding, means for supplying a direct current to said brushes, means for revolving the brushes at such speed as to cause the relative speed of the brushes and the inducing member to equal the synchronous speed of the motor, and means for shifting the axis of the brushes to bring it into such relation to the axis along which the inducing member is connected to the source of alternating E. M. F. that these axes will substantially coincide when the alternating E. M. F. is passing through zero.

14. The method of starting an alternating current motor having an inducing member, an induced member provided with a commuted winding and a second winding, and revolvable brushes co-operating with said commuted winding, which comprises driving the brushes at synchronous speed, supplying direct current to the brushes, and varying the voltage impressed on the inducing member.

15. The method of starting an alternating current motor having an inducing member, an induced member provided with a commuted winding and a second winding, and revolvable brushes co-operating with said commuted winding which comprises, driving the brushes at synchronous speed, supplying direct current to the brushes, varying the magnitude of said current, and varying the voltage impressed on the inducing member.

16. The method of starting an alternating current motor having an inducing member, an induced member provided with a commuted winding and a second winding, and revolvable brushes co-operating with said commuted winding, which comprises driving the brushes at synchronous speed, supplying direct current to the brushes, and simultaneously increasing the magnitude of said current and increasing the voltage impressed on the inducing member.

In testimony whereof, I have hereunto set my hand and affixed my seal.

VALÈRE A. FYNN. [L. S.]